(12) United States Patent
Putcha et al.

(10) Patent No.: US 11,580,612 B2
(45) Date of Patent: Feb. 14, 2023

(54) SYSTEMS AND METHODS FOR TRANSPORTATION STAFFING

(71) Applicant: Walmart Apollo, LLC, Bentonville, AR (US)

(72) Inventors: Sai Phaneendra Sri Harsha Viswanath Putcha, Bentonville, AR (US); Yiqiang Su, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 436 days.

(21) Appl. No.: 16/361,820

(22) Filed: Mar. 22, 2019

(65) Prior Publication Data

US 2019/0295204 A1  Sep. 26, 2019

Related U.S. Application Data

(60) Provisional application No. 62/647,231, filed on Mar. 23, 2018.

(51) Int. Cl.
| | |
|---|---|
| *G06Q 10/06* | (2012.01) |
| *G06Q 50/28* | (2012.01) |
| *G06Q 10/0631* | (2023.01) |
| *G06Q 10/067* | (2023.01) |

(52) U.S. Cl.
CPC ........... *G06Q 50/28* (2013.01); *G06Q 10/067* (2013.01); *G06Q 10/06315* (2013.01); *G06Q 10/063116* (2013.01)

(58) Field of Classification Search
None
See application file for complete search history.

(56) References Cited

U.S. PATENT DOCUMENTS

| | | | |
|---|---|---|---|
| 2010/0036606 A1* | 2/2010 | Jones | G06Q 10/047 701/533 |
| 2010/0228473 A1* | 9/2010 | Ranford | G06Q 10/1095 701/465 |
| 2013/0096815 A1* | 4/2013 | Mason | G08G 1/20 701/400 |
| 2014/0046585 A1* | 2/2014 | Morris, IV | G01C 21/3415 701/468 |
| 2016/0379168 A1* | 12/2016 | Foerster | G06Q 10/08355 705/7.16 |

* cited by examiner

*Primary Examiner* — Alan Torrico-Lopez
(74) *Attorney, Agent, or Firm* — Fitch, Even, Tabin & Flannery LLP (57) ABSTRACT

Exemplary embodiments provide a transportation staffing management system. An amount of transportations miles are forecasted for delivering inventory from a distribution enter to a store based on a sales forecast for a store. Non-driving time for drivers engaged in delivering inventory to a store is tracked based on data collected in real-time from mobile computing devices associated with delivery vehicles. An amount of time needed to deliver the inventory based on the forecasted amount of transportation miles and non-driving is calculated. An optimal transportation workload is generated for the distribution center based on the amount of time, data from a first database storing data from a central office, and data from a second database storing data from a distribution center.

10 Claims, 11 Drawing Sheets

SYSTEMS AND METHODS FOR TRANSPORTATION STAFFING

CROSS-REFERENCE TO RELATED PATENT APPLICATIONS

This application claims priority to U.S. Provisional Application No. 62/647,231, filed on Mar. 23, 2018, the content of which is hereby incorporated by reference in its entirety.

BACKGROUND

Distribution centers and suppliers have transportation goals for distributing inventory to stores and other destinations. Transportation needs can be affected by variable inventory demand and drivers work schedules.

BRIEF DESCRIPTION OF DRAWINGS

Some embodiments are illustrated by way of example in the accompanying drawings and should not be construed to limit the present disclosure.

DESCRIPTION OF EXEMPLARY EMBODIMENTS

Described in detail herein are systems, methods, and computer readable medium for a transportation staffing system that generates an optimal transportation workload for delivering inventory based on forecasted sales at stores. Example embodiments provide for forecasting an amount of transportation miles needed to deliver inventory from a distribution centers to multiple stores based on sales forecasts for the multiple stores. Non-driving time is tracked for drivers while delivering inventory from the distribution center to the stores. Using the forecasted transportation miles and tracked non-driving time, the transportation staffing system calculates the amount of time needed to deliver the inventory from the distribution center to the stores. A staffing module or engine of the transportation staffing system generates an optimal transportation workload for a distribution center based on the calculated amount of time needed to deliver the inventory from the distribution center to the stores, and based on additional other data as described below. The optimal transportation workload for the facility is used to determine driver and delivery vehicle schedules. A user interface displays the optimal transportation workload and optimal driver schedules.

In one embodiment, the transportation staffing system described herein generates transportation workload based on driver staffing requirements and constraints for each store served by a distribution center. In an example embodiment, the transportation staffing system chooses the appropriate level of driver staffing to optimize at least the following: vehicle utilization, driver utilization and cost. As used herein, driver "program" refers to a work schedule for a driver. For example, programs may include drivers who drive trucks for 5 days per week. Programs may include drivers who drive trucks for 3 days per week. Exemplary programs may include drivers who drive 5 days and then take two days off, or drivers who drive 5 days and then take 3 days off, etc. The transportation staffing system also takes into consideration part-time drivers and third-party/contract drivers to help fulfill peak or variable transportation demands.

Demand may come from the following sources: outbound trips, inbound trips, wholesale club trips, returns trips, etc. The transportation staffing system takes as input a daily number of hours of demand and generates an optimal number of full time, part time and third party drivers for each forecasted day of demand.

This information is presented to a user, for example a manager at a distribution center, via an interactive user interface. The user interface displays the optimal transportation workload and schedule in an easy to understand manner.

The transportation staffing system described herein defines driver schedules that maximize fleet flexibility, and ensures driver schedules optimally align fleet capacity to workload at the lowest possible cost. The transportation staffing system can also quantify resource and asset impact of implementing the optimal driver schedules.

In some embodiments, rather than relying on only historical data to determine optimal transportation workload, the transportation staffing system determines optimal transportation workload based on financial analysis and forecasted sales data. The optimal transportation workload determined by the transportation staffing system is then used to determine the driver schedules. The transportation staffing system determines the optimal transportation workload based on a sales forecast for the distribution center. The system is also flexible to handle distribution center and store realignments. That is, periodically a store may be realigned to be served by another distribution center for various reasons. Since the transportation staffing system determines the optimal transportation workload based on a sales forecast for the distribution center, the system as described herein is able to handle a realignment of stores serviced by the distribution center. To handle errors in sales forecasts and variability in sales forecasts, the drivers' schedules generated by the transportation staffing system have flexibility and focus on achieving the workload at the lowest total cost possible. In an example embodiment, the driver schedules are generated at a server associated with the home office or central office and individual distribution centers do not have control or authority to modify the schedules which ensures that the generated optimal schedules are followed.

Figure 1:
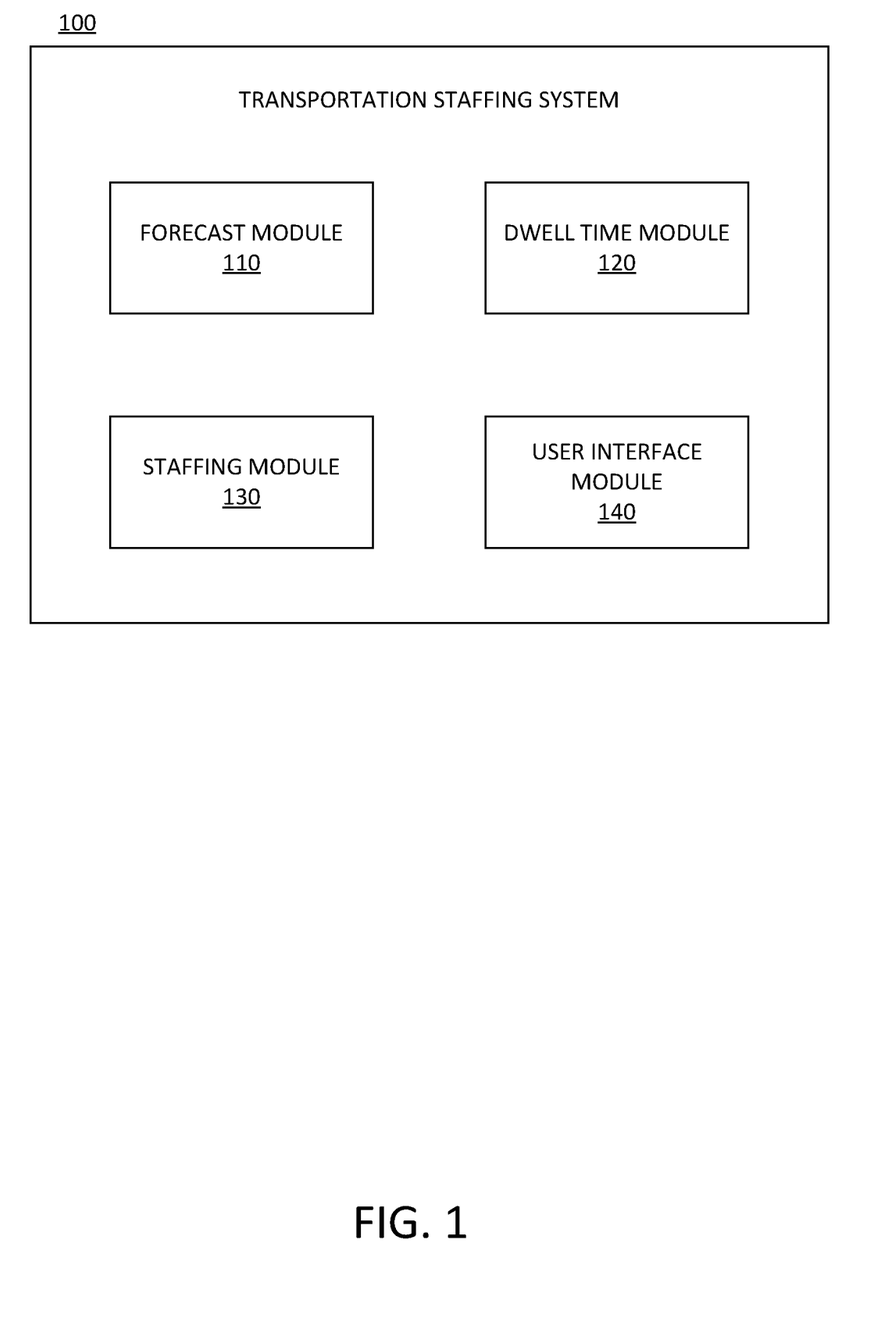
FIG. 1 is a block diagram showing a transportation staffing system implemented in modules, according to an example embodiment.

FIG. 1 is a block diagram showing a transportation management system 100 in terms of modules according to an example embodiment. The modules may be implemented in device 1110 or server 1130 shown in FIG. 11. The modules include a forecast module 110, dwell time module 120, staffing module 130, and user interface module 140. The modules may include various circuits, circuitry and one or more software components, programs, applications, apps or other units of code base or instructions configured to be executed by one or more processors included in device 1110 or server 1130. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 1000 (FIG. 10), such as database(s) (e.g., database(s) 1040, 1050, 1060), server (e.g., server 1030), or devices (e.g., device 1010, mobile device(s) 1020).

The forecast module 110 may be configured to forecast an amount of transportation miles needed to deliver inventory from the distribution center to stores serviced by the distribution center. The forecast module 110 may forecast the amount of transportation miles based on a sales forecast for a defined time period and based on non-driving time tracked by the dwell time module 120. The forecast module 110 also calculates an amount of time needed to deliver the inventory based on the forecasted amount of transportation miles.

The dwell time module 120 may be configured to track non-driving time for multiple drivers engaged in delivering inventory to the stores serviced by the distribution center via a multiple routes. The non-driving time may be tracked using mobile computing devices associated with the delivery vehicles driven by the drivers. The mobile devices are used to track activity, or lack thereof, by the drivers. In one embodiment, a driver may update their status via a user interface provided by their mobile computing device. In another embodiment, the mobile computing device may track location of the driver and/or associated delivery vehicle via a GPS or other sensor and determine whether either is moving.

The staffing module 130 may be configured to generate an optimal transportation workload for the distribution center based on the amount of time calculated by the forecast module 110, and data from the central office and distribution center. The optimal transportation workload schedule assigns at least some of the drivers and delivery vehicles a schedule to deliver inventory from the distribution center to the stores.

The user interface module 140 may be configured to manage and display information relating to the optimal transportation workload and optimal driving schedules generated by the transportation staffing system 100.

The exemplary transportation staffing system generates an optimal transportation workload for a distribution center to deliver inventory to all the stores that it services. Although exemplary embodiments describe generation of an optimal transportation workload for a distribution center to deliver inventory to its stores, it should be understood that the transportation staffing system described herein can also be used to generate an optimal transportation workload for suppliers to deliver inventory to a distribution center.

In a non-limiting example implementation, a home office or central office of a business services multiple distribution centers for the business. A distribution center services one or more stores. In an exemplary transportation staffing system, mobile computing devices (e.g., mobile devices 1020 of FIG. 10) are respectively associated with delivery vehicles. Each delivery vehicle (e.g., truck or tractor) is operated by one or two of a group of drivers.

Figure 10:
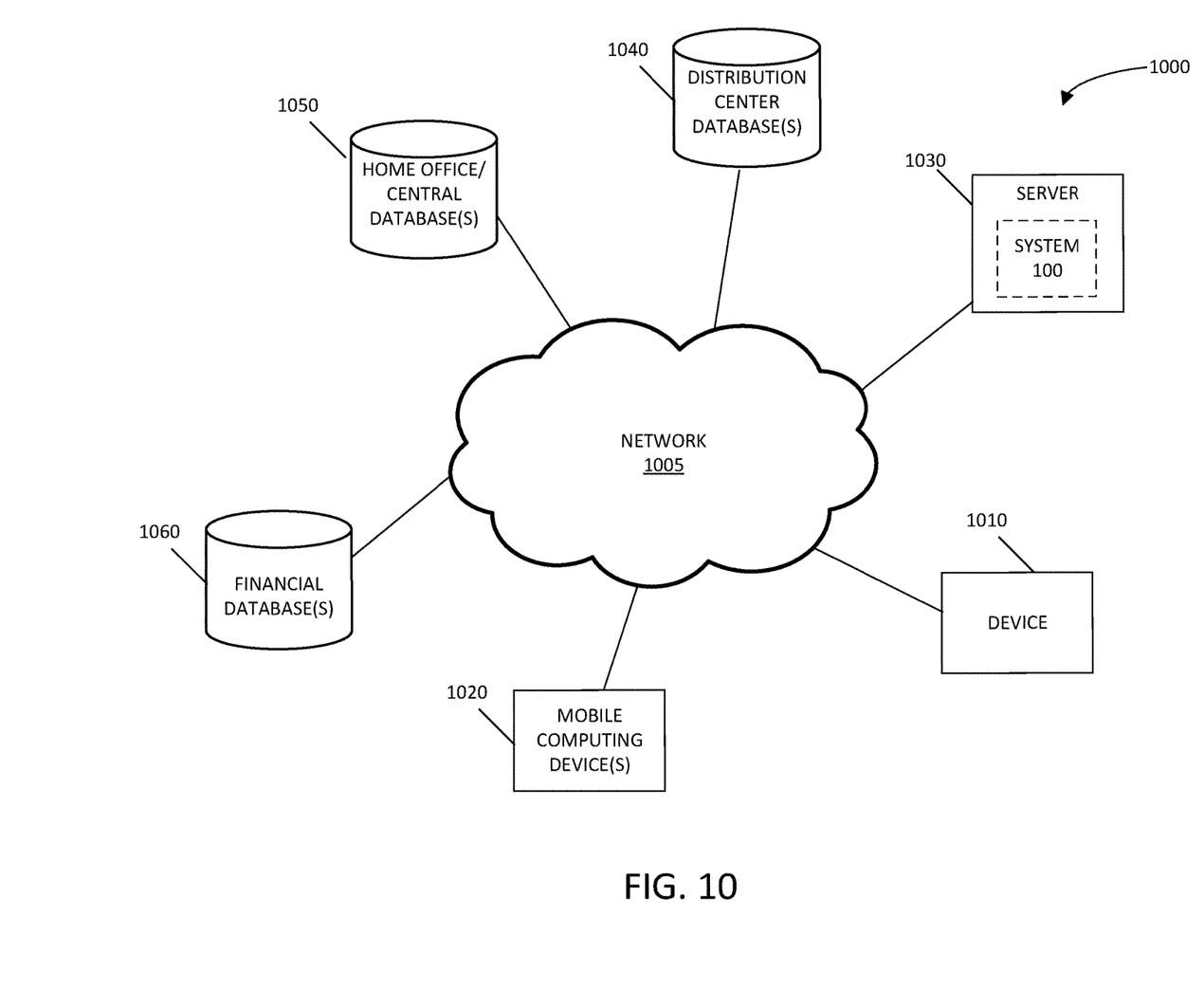
FIG. 10 illustrates a network diagram depicting a system for implementing the transportation staffing system, according to an example embodiment.

An exemplary transportation staffing system includes a first database that stores data from a central office or home office of a business (e.g., home office/central database(s) 1040 of FIG. 10). A second database is also included that stores data from a distribution center (e.g., distribution center database(s) 1050 of FIG. 10). In other embodiments, the transportation staffing system also includes a third database for storing financial data (e.g., financial database(s) 1060 of FIG. 10). Exemplary data stored in the first database (s), second database(s) and third database(s) is described herein in connection with FIG. 3.

Figure 2:
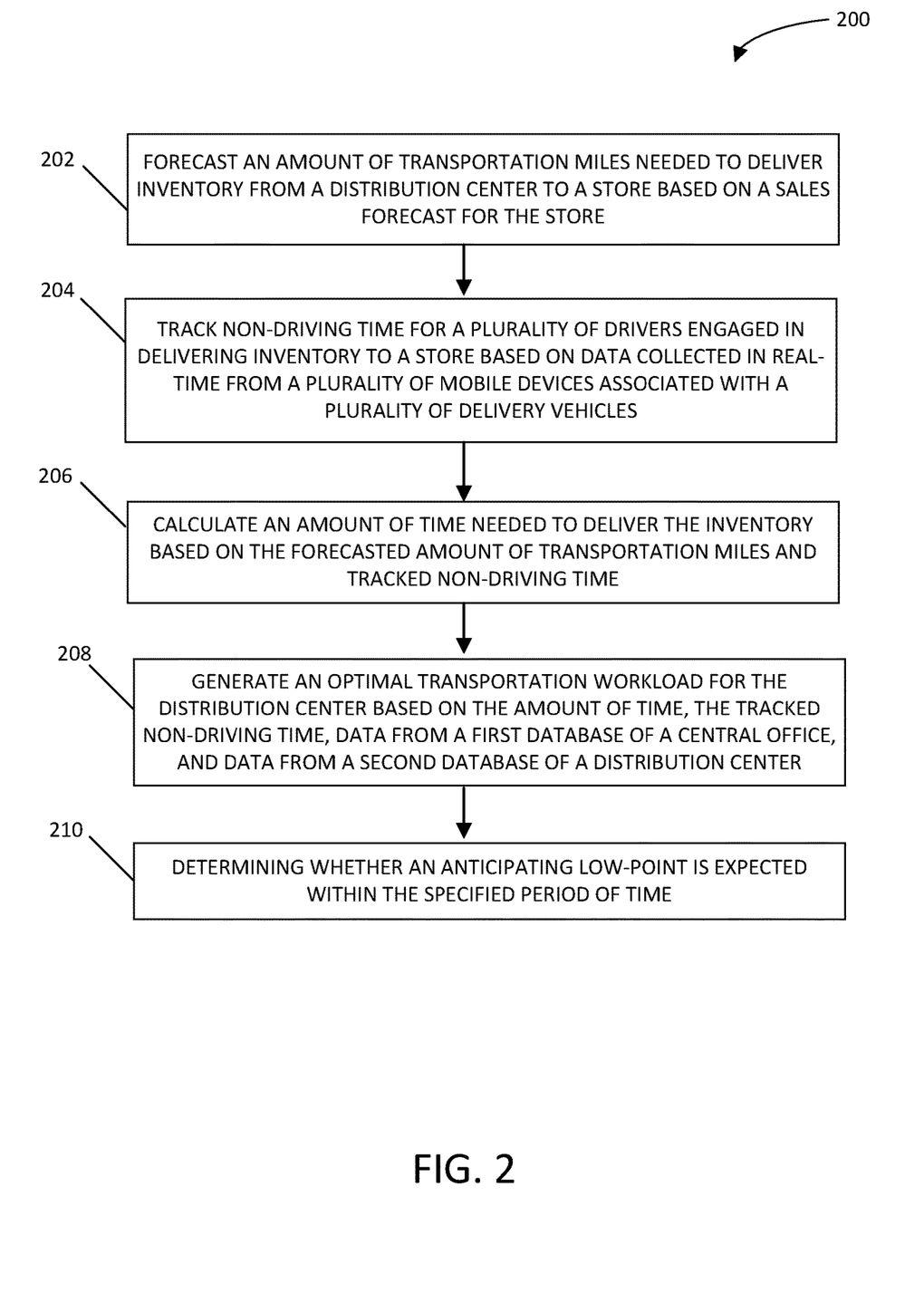
FIG. 2 is a flowchart showing an example method for generating a transportation staffing schedule, according to an example embodiment.

FIG. 2 is a flow chart showing an example method 200 for generating a transportation staffing schedule, according to an example embodiment. The method 200 may be performed using the modules in the transportation staffing system 100 shown in FIG. 1.

At step 202, the forecast module 110 forecasts an amount of transportation miles needed to deliver inventory from a distribution center to stores served by the distribution center based on a sales forecast for the stores. The forecast module 110 may forecast the amount of transportation miles needed to deliver inventory from the distribution center to each store separately based on the sales forecast of that particular store, and then forecast the amount of transportation miles needed to deliver inventory to all the stores served by the distribution center by aggregating the transportation miles needed to deliver inventory to each individual store.

In an example embodiment, the forecasted transportation miles are converted to driving time needed to deliver the inventory from the distribution center to the stores. In an example embodiment, the forecasted transportation miles are converted to time based on the miles and speed of the delivery vehicles (e.g., time=distance/speed). The speed of the delivery vehicles may be determined based on data collected by the mobile computing devices associated with the delivery vehicles and/or drivers. In an example embodiment, the various speed data collected for each of the delivery vehicles is averaged to use in the conversion of the forecasted transportation miles to time. This calculation may be performed on a distribution center level as the location of the distribution center can affect the speed of the delivery vehicle. For example, the maximum speed varies by location, city and state. The speed also varies by the type of road (e.g., interstate highway, state routes, city roads, etc.).

At step 204, the dwell time module 120 tracks non-driving time for drivers engaged in delivering inventory to a store. The non-driving time may be tracked based on data collected in real-time from mobile devices respectively associated with the delivery vehicles used to deliver inventory. In an example embodiment, the non-driving time is also retrieved for historic or past deliveries of inventory, and is used in forecasting transportation workload for a period of time. In another embodiment, the non-driving time is determined using statistical analysis to find the fittest line or curve for the dwell or non-driving time for the distribution center for a period.

At step 206, the forecast module 110 calculates an amount of time needed to deliver the inventory from the distribution center to the stores based on the forecasted amount of transportation miles and the tracked non-driving time. In an example embodiment, the amount of driving time needed is calculated in hours. In calculating the amount of driving time the forecast module 110 takes into consideration the miles that need to be driven (forecasted at step 202) and the non-driving time (tracked at step 204). For example, the forecast module 110 sums up the forecasted transportation miles converted to time and the non-driving time to calculate the total amount of driving time needed. In addition to other factors, the amount of driving time in hours drives the determination of the transportation workload for the distribution center.

At step 208, the staffing module 130 generates an optimal transportation workload for the distribution center to deliver inventory to the stores. The optimal transportation workload is generated based on the amount of time calculated at step 206 by the forecast module 110, data from the first database of the central office and data from the second database of the distribution center. Once the optimal amount of work to be done has been calculated, driver and vehicle assignment may take place.

In an example embodiment, the first database stores data relating to the cost for a private fleet, the cost for a third-party fleet, length of haul, driver program utilization, end of work week productivity loss, driver-tractor factors, schedule outline, staffing period, and driver utility. In an example embodiment, the second database stores data relating to driver working hours, slip seating requirements, exceptional truck assignments, tractor utilization, tractor idle cost, truck type, exceptional driver-truck requirement, and driver assignment to truck.

In an example embodiment, the transportation staffing system generates the optimal transportation workload for delivering inventory from the distribution center to the stores for a year. In another embodiment, the transportation staffing system generates the optimal transportation workload for 16 weeks, 17 weeks, or 18 weeks. These variable periods are described further in connection with FIG. 6.

In an example embodiment, the transportation staffing system generates an optimal number of transportation resources from a private fleet and an optimal number of transportation resources from a third-party fleet. The transportation staffing system may also calculate the number of flex or part-time drivers. In determining flex or part-time drivers, the transportation staffing system takes into consideration the percentage of full-time drivers that are on paid-time-off (PTO) or leave-of-absence (LOA) for a distribution center. The transportation staffing system also considers the minimum and maximum mileage constraints for flex or part-time drivers, and the number of flex or part-time drivers needed to maintain a certain percentage buffer (e.g., 3% buffer).

In an example embodiment, the staffing module 130 generates the optimal transportation workload using mixed integer programming. In a non-limiting example, mixed integer programming may be a mathematical optimization or feasibility program in which some or all variables are restricted to be integers.

In an example embodiment, driver staffing requirements are collected and stored in a database. Integer decision variables are created for the mixed integer programming implemented at the staffing module 130 as follows:

id: index represents the driver program i and starts at day of week d $X_{id}$: integer decision variables that represents the number of driver scheduled from driver program i and starts at day of week d.

Next, objective functions are built as follows:

If minimize the number of drivers scheduled, then objective is min $\Sigma_{id} X_{id}$ If minimize the number of cost, then objective is $\Sigma_{id} C_{id} X_{id}$ Constraints are built into the mixed integer programming model. Business constraints are organized into groups that can be represented by a single line mathematical model. The business constraints are translated into mathematical inequality. For example, the transportation staffing scheduled cannot include more than 20% of 5-day drivers. This can be presented as the following equation: $\Sigma_{id:i\ is\ 5\text{-}day\ driver} X_{id} \leq 0.2 \times \Sigma_{id} X_{id}$.

In an example embodiment, the above mathematical model is programed using a Java® platform.

In another embodiment, the staffing module 130 generates the optimal transportation workload using stochastic modeling. In a non-limiting example, stochastic modeling may be considered to be a tool for estimating probability distributions of potential outcomes by allowing for random variation in one or more inputs over time. The random variation may be based on fluctuations observed in historical data for a selected period using time-series techniques. Distributions of potential outcomes may be derived from a large number of simulations which reflect the random variation in the inputs.

At step 210, the user interface module 140 generates a user interface displaying the optimal transportation workload. Exemplary user interfaces are described herein in connection with FIGS. 7, 8 and 9. In an example embodiment, the user interface receives a user input specifying a difference in sales forecast and in response the staffing module 130 dynamically updates the optimal transportation workload. The user interface displays the updated optimal transportation workload based on the user input. In one embodiment, the user input relates to a percentage of error in the sales forecast for a store.

In an example embodiment, the transportation staffing system forecasts miles for particular budget goals and takes into consideration various factors, such as, sales growth from merchants, sales growth conversions to cases by distribution center finance team, adjustments to case volume and length of haul due to store realignment, addition of CPT forecasts, historical CCOB percentage by commodity goals, DS estimates from the historical data, and estimates for other initiatives impacting volume or miles.

In an example embodiment, monthly budgeted miles for a store are converted to daily miles using historical DoW % spilt by distribution center.

In an example embodiment, a financially profitable workload for the business's private fleet is calculated based on various factors, such as, private fleet utilization by location, private fleet tractor sunk cost, private fleet driver sunk cost, private fleet variable cost per mile, and third-party fleet variable cost per mile.

Figure 3:
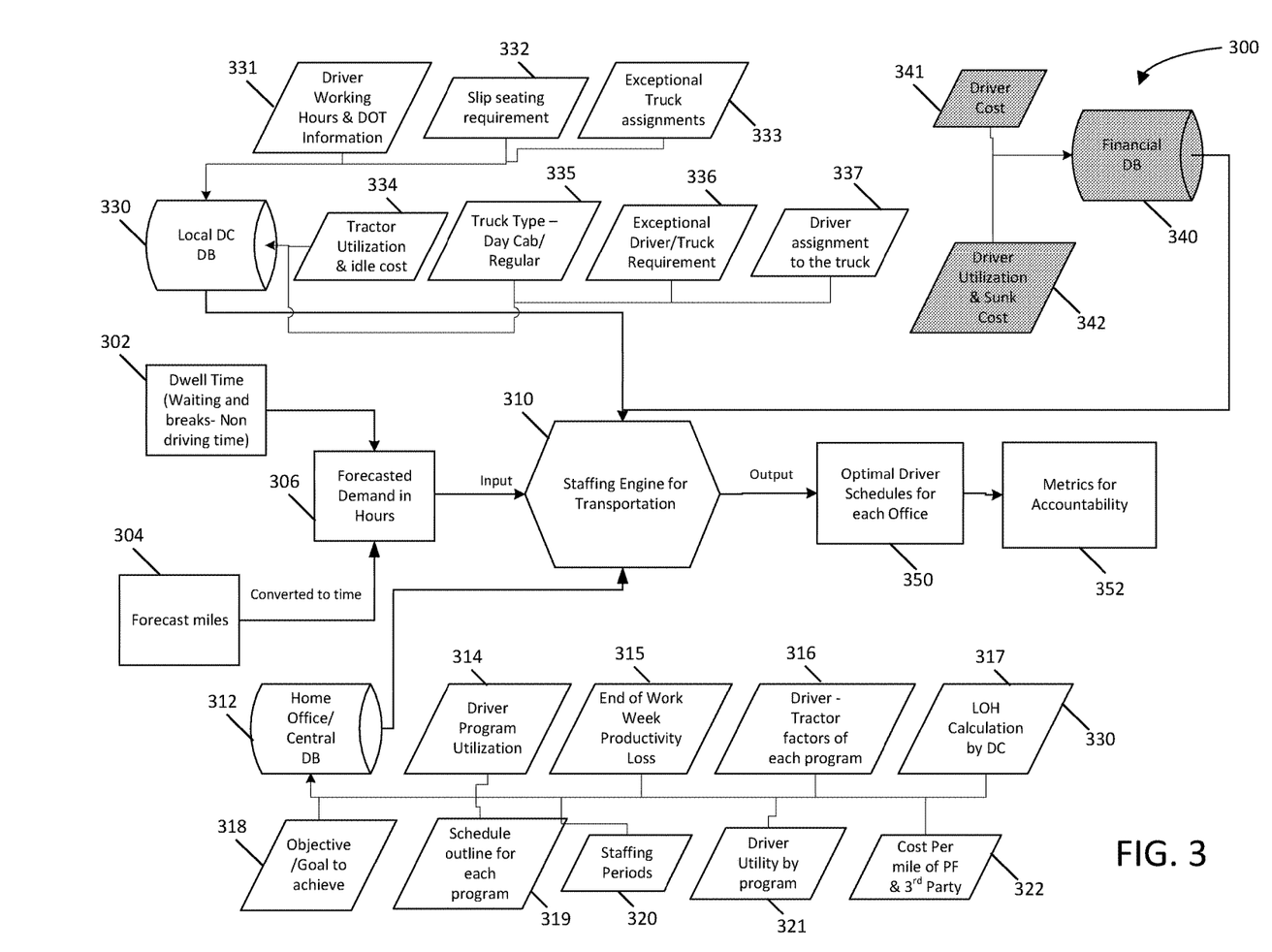
FIG. 3 is a schematic showing an exemplary transportation staffing system, according to an example embodiment.

FIG. 3 is a schematic showing an exemplary transportation staffing system 300, according to an example embodiment. FIG. 3 illustrates the various data input into the staffing module 310 and various data processing components used for analysis and processing and to generate the optimal transportation workload and optimal driver schedules 350 and to provide a user interface displaying metrics for accountability 352.

Dwell time 302 refers to the non-driving time described above. Forecast miles 304 refers to the miles forecasted for delivering inventory from a distribution center to multiple stores based on sales forecast for the stores. Block 306 analyzes dwell time 302 and forecast miles 304 to determine forecasted demand for transportation workload in hours.

Data from the home office/central office database 312 is input into the staffing engine 310. The home office/central office database 312 stores data illustrated in blocks 314-322. Driver program utilization data 314 includes data indicating how much a driver works in a program. For example, a 5-day program driver may transport inventory for 4 days, then his utility is 4/5. In an example embodiment, driver utility is calculated for a 4-month period for all the drivers by program and aggregated to home office.

End of work week productivity loss 315 includes data indicating the loss of productivity on the last day of a work 'week' for a driver. For example, a driver needs to be brought back to the home/original location on the last day so they can go home. In this case, there is not always an optimized route to bring him back with a tractor full of inventory, and so all hours on the last day are not utilized to the fullest.

Driver-tractor factors of each program 316 includes data indicating various factors for a driver and truck based on the program.

Length of haul calculated by distribution center 317 includes data indicating the total distance a distribution center serves its stores. When the stores for a distribution center are realigned, this distance is also updated.

Goal to achieve 318 includes data indicating a financial goal, workload goal, and/or a sales goal to be achieved in determining an optimal transportation workload or schedule.

Schedule outline for each program 319 includes data indicating the various possible program schedules. For example, a program where a driver drives 5 days and is off 2 days may be indicated in a binary manner, such as X X X XX O O.

Staffing periods 320 includes data indicating periods for which the transportation staffing system is executed. For example, as described herein, the transportation staffing system may be run for 3 periods.

Driver utility by program 321 includes data indicating how many drivers are utilized for each program.

Cost per mile of private fleet and third-party fleet 322 includes data indicating the cost of using the private fleet (for example, gas, storage cost, maintenance cost, etc.) and the cost of using third-party fleet (for example, gas, additional usage fees, etc.)

Data from the local distribution center database 330 is input into the staffing engine 310. The local distribution database 330 stores data illustrated in blocks 331-337. Driver working hours and department of transportation data 331 includes data indicating the weeks a driver works and other DOT data.

Slip seating requirement data 332 includes data indicating sharing of trucks between drivers. For example, a truck assigned to a driver who is off 2 days, may be used by another driver while the first driver is off. There are certain factors that need to be considered when trucks are shared by drivers to determine which drivers can share trucks. For example, these factors may include which are smoking drivers and which are non-smoking drivers with the aim to not have them share the same truck, etc.

Exceptional truck assignments data 333 includes data indicating route based exceptions in assigning trucks to drivers, such as, night routes, day routes or the like.

Tractor utilization and idle cost data 334 includes data indicating the cost for using trucks and the cost incurred when a truck is not in use (idle).

Truck type data 335 includes data indicating the type of truck, for example, refrigerated, non-refrigerated, beds for drivers to rest, etc.

Exceptional driver/truck requirement data 336 includes data indicating exceptions for a specific driver assignment to a specific truck. For example, a non-smoking driver is assigned to a truck that is driven by other non-smoking drivers. A driver who has reached a certain safety mileage goal is assigned to only one truck or his preferred truck.

Driver assignment to truck data 337 includes data indicating a driver truck assignment.

Data from the financial database 340 is input into the staffing engine 310. The financial database 340 stores data illustrated in blocks 341-342. Driver cost data 341

Driver utilization and sunk cost 342 includes data indicating cost of under-utilized drivers. For example, 80 drivers may be needed on Monday and Wednesday, however only 75 drivers are needed on Tuesday with the result that 5 drivers are not working, but still on payroll, for Tuesday. The sunk cost refers to the cost of not using the 5 drivers on Tuesday.

Figure 4A:
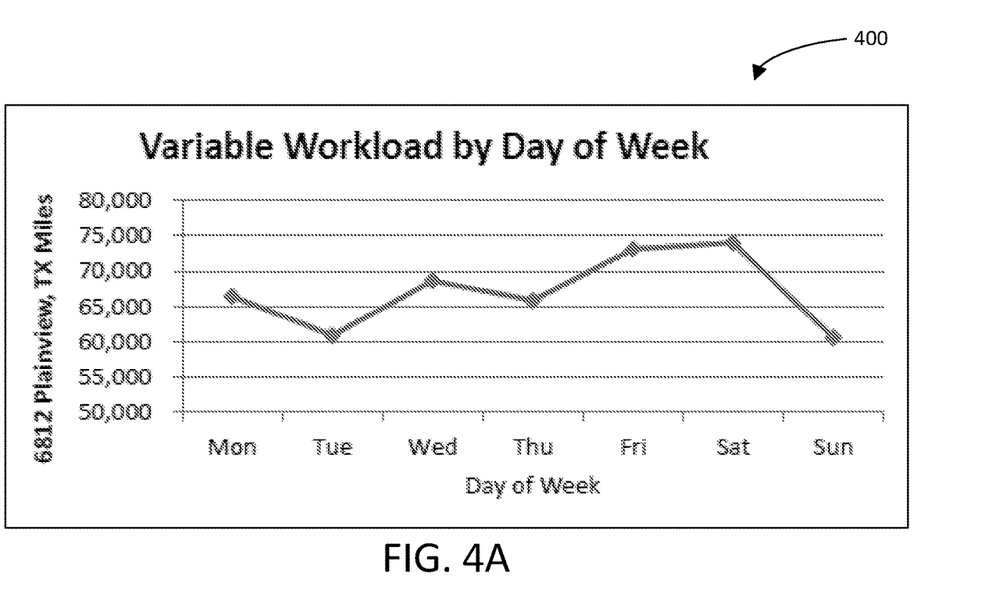
FIGS. 4A and 4B depict graphs showing example transportation workloads for a variety of stores.
Figure 4B:
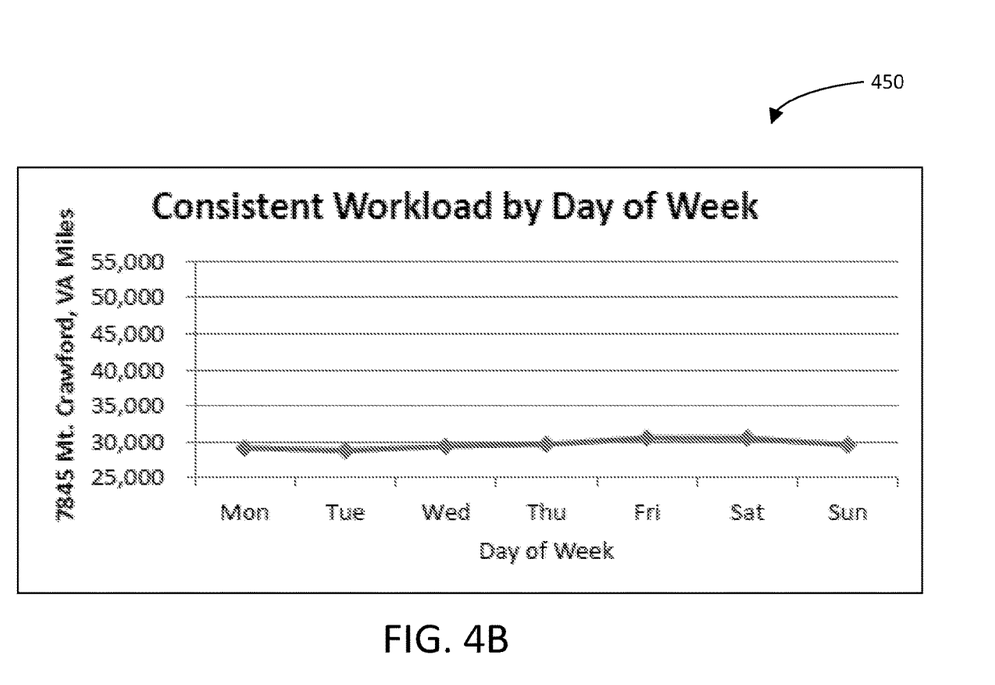

FIGS. 4A and 4B depict graphs 400, 450 showing example historic transportation workloads for a variety of stores. These historic transportation workloads are not an optimal workload generated by the transportation staffing system. Graph 400 in FIG. 4A shows an example historic transportation workload for a first store. As shown, the workload for the first store is highly variable for the given week. Graph 450 in FIG. 4B shows an example historic transportation workload for a second store. As shown, the workload for the second store is substantially consistent for the given week.

It is ideal to have a consistent workload for a given week or period to reduce the risk of under-utilized transportation assets (trucks and drivers). Limited value is realized by rotating driver schedules in an attempt to maximize tractor utilization in a highly variable workload scenario. Highly variable workloads also require flexible, lower utilization driver schedules to match workload and capacity, which is financially undesirable.

Figure 5:
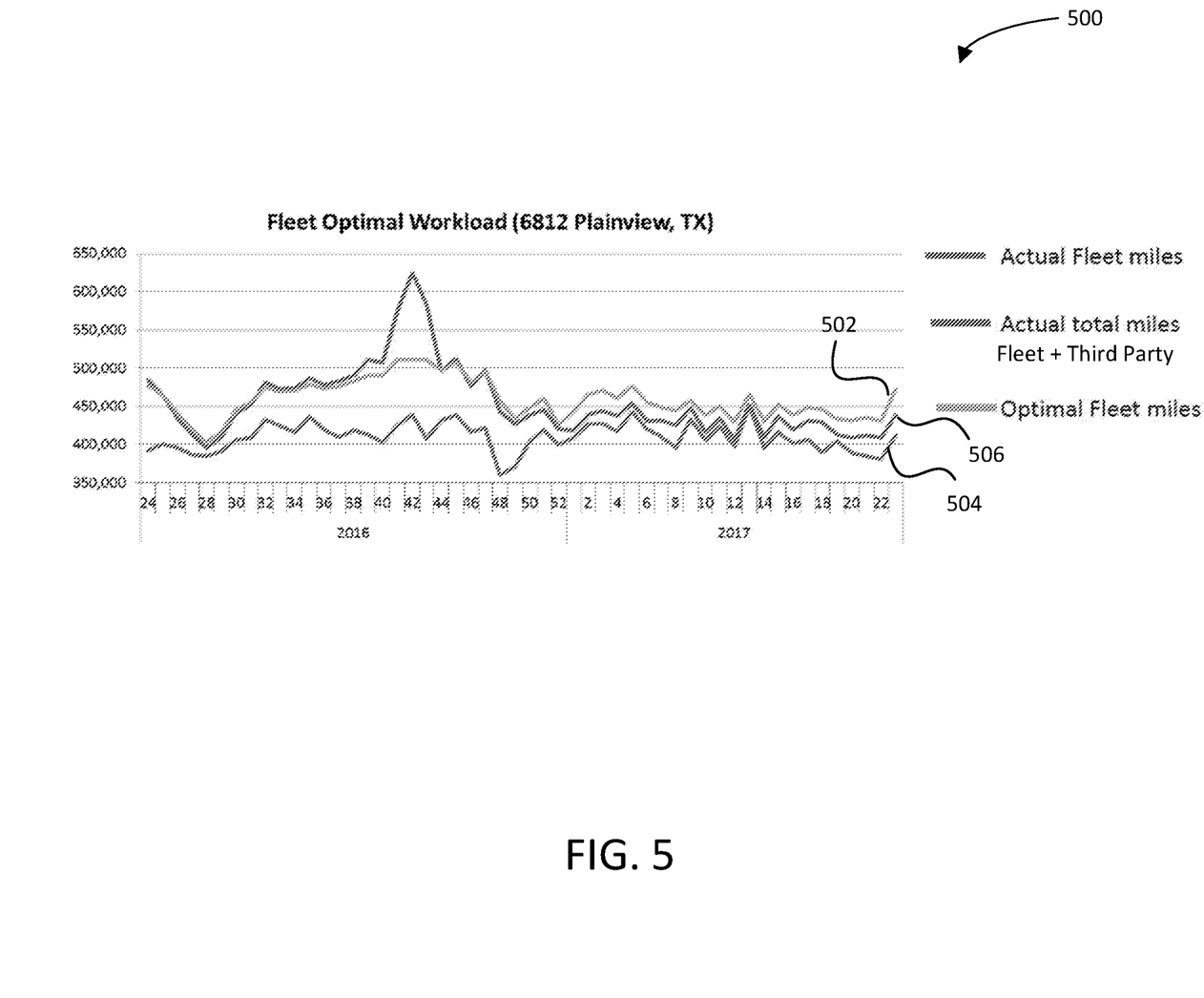
FIG. 5 depicts a graph showing an example optimal workload.

FIG. 5 depicts a graph 500 showing an example fleet optimal workload compared to actual private fleet miles and actual total miles (including private fleet and third-party fleet) over a period. The optimal workload in miles for weeks 24 to 52 in 2016 and weeks 1 to 22 in 2017 is represented by line 502. The optimal workload in miles is determined based budget constraints and financial profitability. The workload of the private fleet in miles for weeks 24 to 52 in 2016 and weeks 1 to 22 in 2017 is represented by line 504. The workload of the private fleet and third-party fleet in miles for weeks 24 to 52 in 2016 and weeks 1 to 22 in 2017 is represented by line 506. The goal for the optimal workload is to determine the right mix of private fleet and third-party fleet so that the business is not losing money by underutilization of its private fleet of delivery vehicles and by spending more by hiring a third-party fleet. It should be understood that it is difficult to eliminate the use of a third-party fleet because of the variability in transportation workload. To minimize the total expense, the transportation staffing system described herein is configured to increase the private fleet workload and reduce third-party fleet workload, incur higher sunk costs resulting from underutilized assets, and refine driver schedules to flex down.

Figure 6:
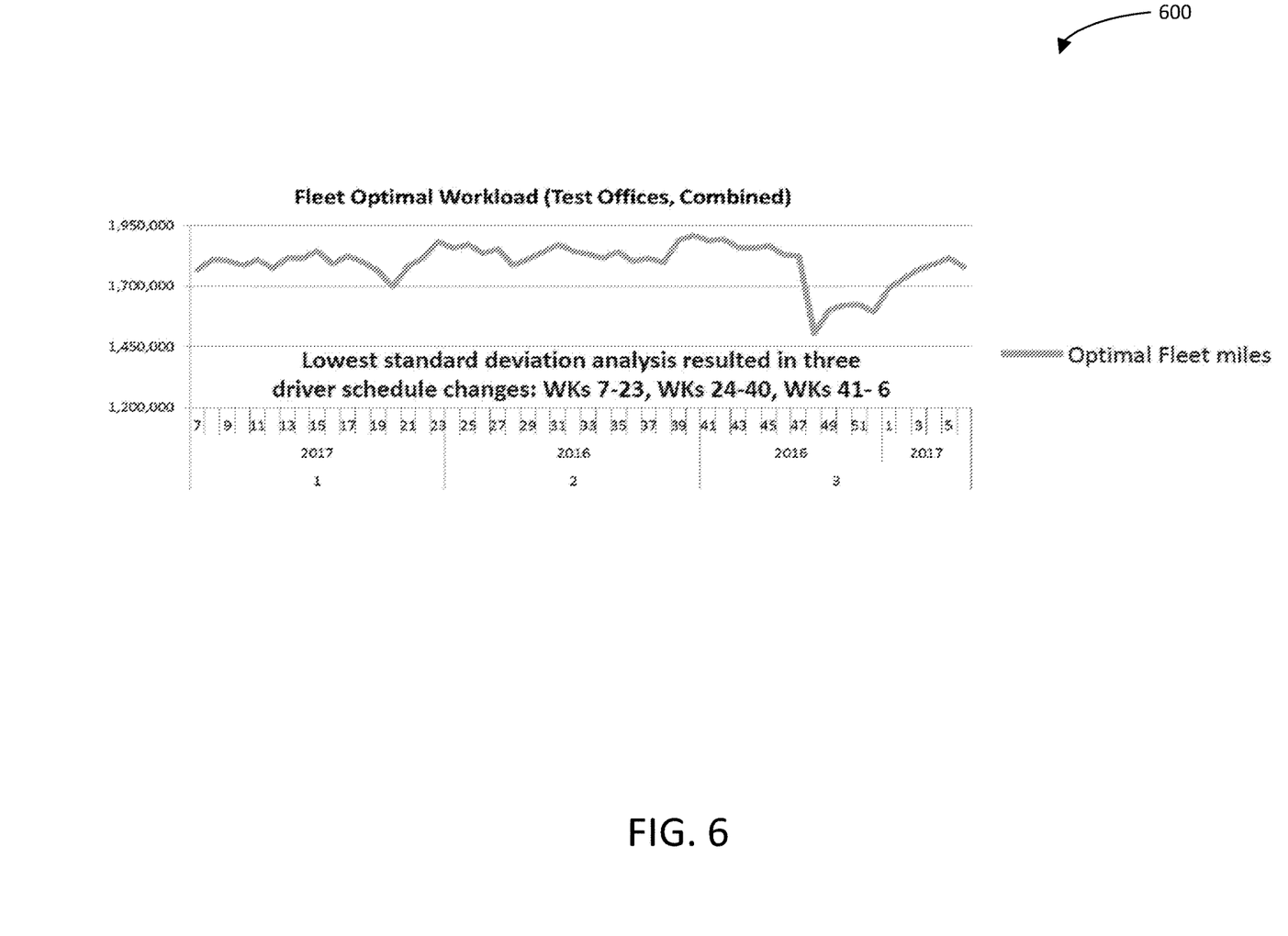
FIG. 6 depicts a graph showing an example optimal workload.

FIG. 6 depicts a graph 600 showing an example fleet optimal workload. To determine an optimal transportation workload, the transportation staffing system is configured for periodic changes of schedules. The transportation staffing system analyzes frequency and duration annually based on forecasted workload variability to best match driver capacity to workload. The optimal workload and schedules generated by the transportation staffing system includes limited changes to driver schedules with consistent weekly volume. To aid in generating optimal transportation workloads, the transportation staffing system analyzes data for specific period of times. As it can be seen from graph 500, the workload varies highly over a 52 week period, however it is more consistent when considered for shorter periods or smaller number of weeks. In an example embodiment, the transportation staffing system analyzes data for three specified periods for the sales year for the business. For example, the first period ranges from week 7 to week 23, the second period ranges from week 24 to week 40, and the third period ranges from week 41 to week 6 (of the next year). As shown in graph 600, the workload during the first period (week 7 to 23) is more consistent when compared to the workload over the year. Similarly, as shown in graph 600, the workload during the second period (week 24 to 40) is more consistent when compared to the workload over the year, and the workload during the third period (week 41 to 6) is more consistent when compared to the workload over the year. In an example embodiment, these periods are determined based on lowest standard deviation analysis of the optimal workload line 502 shown in FIG. 5. The workload volume forecasted for each period is more consistent. In other embodiments, there may be fewer or more than three periods. The transportation staffing system is capable of analyzing data for fewer or more periods. Moreover, the number of periods or the number of weeks within a period can change based on changes in sales forecast, inventory demand, or other factors.

Figure 7:
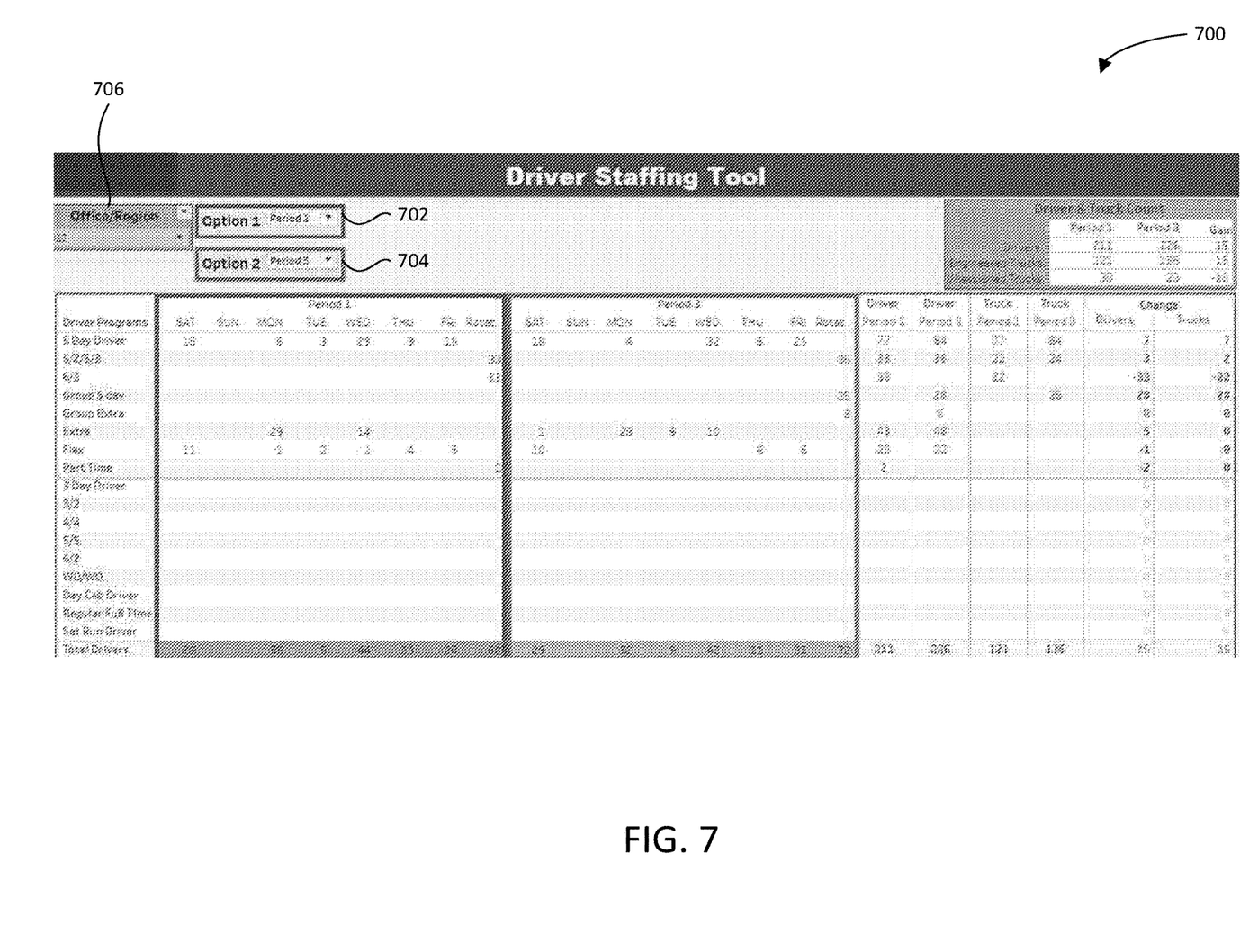
FIG. 7 depicts an example user interface displaying an interactive strategic view of the optimal workload generated by the transportation staffing system.

FIG. 7 depicts an example user interface 700 displaying an interactive strategic view of the optimal workload generated by the transportation staffing system. The user interface 700 displays workload for a first exemplary period and a third exemplary period for comparison by a user. The user interface can be updated to display other periods via drop down boxes 702 and 704. The user interface can also be updated to display data for different distribution centers or stores via drop down box 706. A user is able to view optimal transportation workload data for a distribution, which includes delivery of inventory to all stores serviced by the distribution center. A user is also able to view optimal transportation workload data for only one store serviced by the distribution center. Additionally, a user is able to view optimal transportation workload data for multiple distribution centers within a specified region. The user interface 700 shows the number of drivers per program, number of trucks needed, number of full-time drivers, number of part-time drivers, flex time drivers, and utilization of resources.

Figure 8:
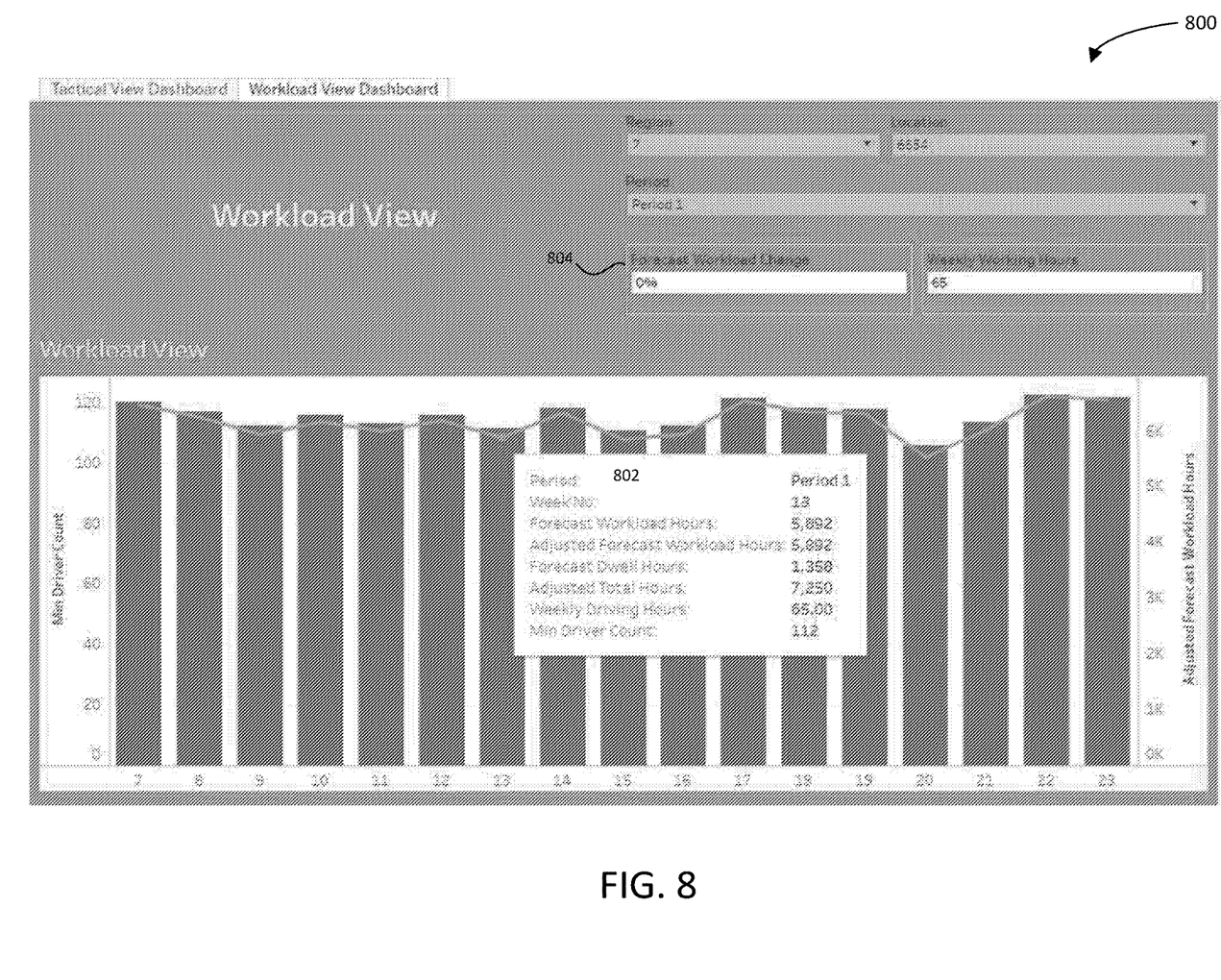
FIG. 8 depicts an example user interface displaying an interactive view of the optimal workload for a period generated by the transportation staffing system.

FIG. 8 depicts an example user interface 800 displaying an interactive view of the optimal workload for a period generated by the transportation staffing system. The user interface 800 displays an optimal workload for a first period from week 7 to week 23. The bar graph indicates the optimal transportation workload generated by the transportation staffing system. The line graph indicates the optimal number of drivers generated by the transportation staffing system. The dialog box 802 displays data associated with a particular point on the line graph and bar graph. A user can enter a number indicating a percent change in the sales forecast or workload forecast at text box 804. The bar graph and the line graph automatically update to reflect the change in the forecast. The user can change the period, distribution center, or store for which data is displayed.

Figure 9:
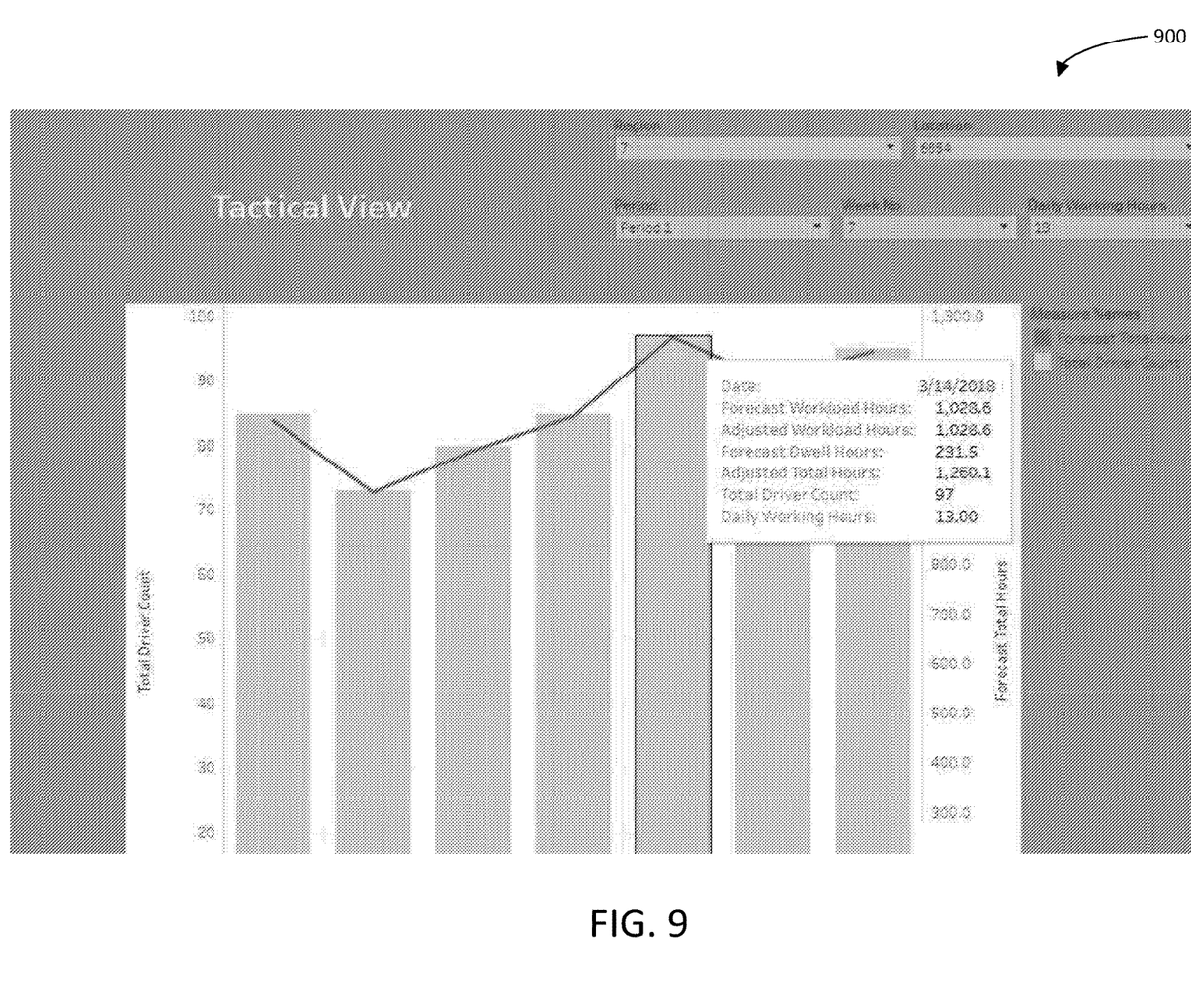
FIG. 9 depicts an example user interface displaying an interactive view of the optimal workload for a week generated by the transportation staffing system.

FIG. 9 depicts an example user interface 900 displaying an interactive daily view of the optimal workload for a week generated by the transportation staffing system. The user interface 900 displays an optimal workload and optimal number of drivers for a week (e.g., week 7). The user can change the week, period, distribution center, or store for which data is displayed.

FIG. 10 illustrates a network diagram depicting a system 1000 for implementing the workforce recommendation tool, according to an example embodiment. The system 1000 can include a network 1005, device 1010, mobile device(s) 1020, server 1030, and multiple database(s), for example, distribution center database(s) 1040, home office/central database(s) 1050 and financial database(s) 1060. Each of the device 1010, sensors 1020, server 1030, and database(s) 1040, 1050 and 1060 is in communication with the network 1005.

In an example embodiment, one or more portions of network 1005 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 1010 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like.

Device 1010 may connect to network 1005 via a wired or wireless connection. Device 1010 may include one or more applications such as, but not limited to, a driver scheduling application, a payroll application, a budget application, an application based on the transportation staffing system, and the like. In an example embodiment, the device 1010 may perform some of the functionalities described herein. For example, the device 1010 displays the user interface associated with the transportation staffing system (e.g., user interfaces of FIGS. 7, 8, 9). Device 1010 may include one or more components of computing device 1100 described in connection with FIG. 11.

The mobile device(s) 1020 may include, but is not limited to, hand-held devices, portable devices, wearable computers, cellular or mobile phones, smart phones, tablets, ultrabooks, netbooks, vehicle installed or integrated computing device, and the like. In an example embodiment, the mobile device(s) 1020 is associated with, for example, in communication with or disposed within, a delivery vehicle. The mobile device(s) 1020 are configured to collect real-time data relating to speed, distance, and time during the delivery vehicle's operational schedule (when the vehicle is in use for inventory delivery). The mobile device(s) 1020 collects data related to the vehicle's speed, vehicle's distance travelled, and time taken to travel the distance. The mobile device(s) 1020 also records the non-driving time of the vehicle, which includes a driver taking a break, driver stopping for regulatory vehicle checks, a driver stopping to fill gas, etc. The mobile device(s) may include one or more sensors for sensing and collecting data such as speed, distance traveled, and time. The mobile device(s) 1020 may connect to network 1005 via a wired or wireless connection. The mobile device(s) 1020 may include one or more components of computing device 1100 described in connection with FIG. 11.

In an example embodiment, the transportation staffing system 100 is included on the server 1030 and is configured to perform some of the functionalities described herein. For example, the server 1030 generates the optimal driver schedules.

The distribution center database(s) 1040 may store data associated with a distribution center, and may include, but is not limited to, driver working hours, DOT information, slip seating requirements, exceptional truck assignments, tractor utilization and idle costs, truck type, exceptional driver/truck requirement, driver assignment to truck, and the like.

The home office/central database(s) 1050 may store data associated with a home office or central office for a business. The database(s) 1050 may include, but is not limited to, driver program utilization, end of work week productivity loss, driver/tractor factors for each program, length of haul for distribution center, objective data, schedule outline for each program, staffing periods, driver utility by program, cost per mile for private fleet, cost per mile for third party, and the like.

The financial database(s) 1060 may store data associated with financial information for a business. The database(s) 1060 may include, but is not limited to, driver cost, driver utilization and sunk cost, and the like.

Each of the database(s) 1040, 1050, 1060, and the server 1030 is connected to the network 1005 via a wired connection. Alternatively, one or more of the database(s) 1040, 1050, 1060, and server 1030 may be connected to the network 1005 via a wireless connection. Although not shown, server 1030 can be (directly) connected to the database(s) 1040, 1050 and 1060. The server 1030 includes one or more computers or processors configured to communicate with device 1010 via network 1005. The server 1030 hosts one or more applications or websites accessed by device 1010 and/or facilitates access to the content of database(s) 1040, 1050 and 1060. Database(s) 1040, 1050, 1060 comprise one or more storage devices for storing data and/or instructions (or code) for use by server 1030 and/or device 1010. Database(s) 1040, 1050, 1060, and/or server 1030 may be located at one or more geographically distributed locations from each other or from device 1010. Alternatively, database(s) 1040, 1050, 1060 may be included within servers 1030.

Figure 11:
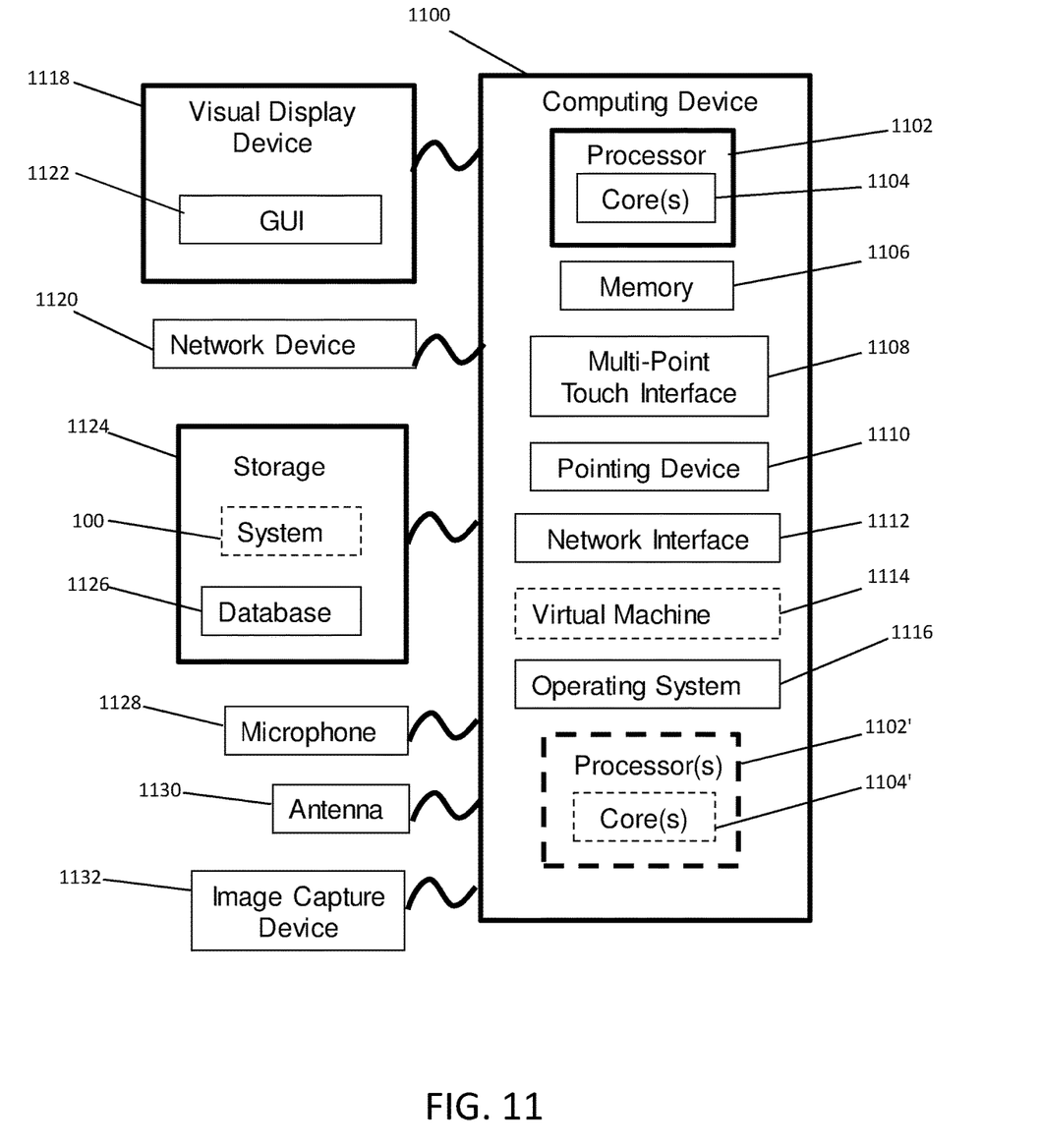
FIG. 11 is a block diagram of an exemplary computing device that may be used to implement exemplary embodiments of the transportation staffing system described herein.

FIG. 11 is a block diagram of an exemplary computing device 1100 that may be used to implement exemplary embodiments of the transportation staffing system 100 described herein. The computing device 1100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1106 included in the computing device 1100 may store computer-readable and computer-executable instructions or software for implementing exemplary embodiments of the transportation staffing system 100. The computing device 1100 also includes configurable and/or programmable processor 1102 and associated core 1104, and optionally, one or more additional configurable and/or programmable processor(s) 1102' and associated core(s) 1104' (for example, in the case of computer systems having multiple processors/cores), for executing computer-readable and computer-executable instructions or software stored in the memory 1106 and other programs for controlling system hardware. Processor 1102 and processor(s) 1102' may each be a single core processor or multiple core (1104 and 1104') processor.

Virtualization may be employed in the computing device 1100 so that infrastructure and resources in the computing device may be shared dynamically. A virtual machine 1114 may be provided to handle a process running on multiple processors so that the process appears to be using only one computing resource rather than multiple computing resources. Multiple virtual machines may also be used with one processor.

Memory 1106 may include a computer system memory or random access memory, such as DRAM, SRAM, EDO RAM, and the like. Memory 1106 may include other types of memory as well, or combinations thereof.

A user may interact with the computing device 1100 through a visual display device 1118, such as a computer monitor, which may display one or more graphical user interfaces 1122 that may be provided in accordance with exemplary embodiments. The computing device 1100 may include other I/O devices for receiving input from a user, for example, a keyboard or any suitable multi-point touch interface 1108, a pointing device 1110 (e.g., a mouse), a microphone 1128, and/or an image capturing device 1132 (e.g., a camera or scanner). The multi-point touch interface 1108 (e.g., keyboard, pin pad, scanner, touch-screen, etc.) and the pointing device 1110 (e.g., mouse, stylus pen, etc.) may be coupled to the visual display device 1118. The computing device 1100 may include other suitable conventional I/O peripherals.

The computing device 1100 may also include one or more storage devices 1124, such as a hard-drive, CD-ROM, or other computer readable media, for storing data and computer-readable instructions and/or software that implement exemplary embodiments of the transportation staffing system 100 described herein. Exemplary storage device 1124 may also store one or more databases for storing any suitable information required to implement exemplary embodiments. For example, exemplary storage device 1124 can store one or more databases 1126 for storing information, such employee work schedules, payroll information, number of current employees, number of hours worked, number of hours scheduled, employment status, open requisitions, goal hours, low-point information, budget information, and/or any other information to be used by embodiments of the system 100. The databases may be updated manually or automatically at any suitable time to add, delete, and/or update one or more items in the databases.

The computing device 1100 can include a network interface 1112 configured to interface via one or more network devices 1120 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 1100 can include one or more antennas 1130 to facilitate wireless communication (e.g., via the network interface) between the computing device 1100 and a network. The network interface 1112 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein. Moreover, the computing device 1100 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 1100 may run an operating system 1116, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, or another operating system capable of running on the computing device and performing the operations described herein. In exemplary embodiments, the operating system 1116 may be run in native mode or emulated mode. In an exemplary embodiment, the operating system 1116 may be run on one or more cloud machine instances.

The following description is presented to enable any person skilled in the art to create and use a computer system configuration and related method and article of manufacture to generate a transportation management system based on forecasted sales at stores. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for transportation staffing management, the system comprising:

a plurality of mobile computing devices respectively associated with a plurality of delivery vehicles, each of the plurality of delivery vehicles operated by one of a plurality of drivers, wherein each of the plurality of mobile computing devices comprises one or more sensors configured to sense and collect real-time data relating to at least one of a speed, a distance traveled, and a time taken to travel the distance for the respective associated delivery vehicle;

a first database storing data from a central office serving a plurality of distribution centers;

a second database storing data from a distribution center from the plurality of distribution centers, wherein a distribution center serves a plurality of stores;

one or more computing devices comprising a visual display device, wherein the one or more computing devices are communicatively coupled over one or more geographically distributed communication networks to the plurality of mobile computing devices and configured to execute a dwell time module comprising a dwell time circuit, a forecast module comprising a forecast circuit, and a staffing module comprising a staffing circuit;

wherein the dwell time module when executed:
    accesses over the one or more geographically distributed communication networks the real-time data and tracks non-driving time for the plurality of drivers engaged in delivering inventory to the store via a plurality of routes based on the real-time data from the one or more sensors associated with each of the plurality of mobile computing devices;

wherein the forecast module is communicatively coupled over the one or more geographically distributed communication networks with the first database, and wherein the forecast module when executed:
    accesses, over the one or more geographically distributed communication networks from the first database, historic non-driving time data and the tracked non-driving time, and forecasts an amount of transportation miles needed to deliver inventory from the distribution center to a store based on a sales forecast for a store for a defined time period, the tracked non-driving time, and the historic non-driving time data, and
    calculates an amount of time needed to deliver the inventory by dynamically converting the forecasted transportation miles to a time value and adding the time value to the non-driving time; and wherein the staffing module when executed:
    accesses, over the one or more geographically distributed communication networks, the first database and the second database and communicates with the forecast model to retrieve the amount of time needed to deliver the inventory calculated by the forecast module;
    generates an optimal transportation workload for the distribution center based on the amount of time needed to deliver the inventory calculated by the forecast module, the data from the central office stored in the first database, and the data from the distribution center stored in the second database, wherein the optimal transportation workload defines driver schedules by assigning at least some of the plurality of drivers and delivery vehicles to deliver the inventory from the distribution center to the plurality of stores;

generates and displays on the visual display device a user interface displaying the optimal transportation workload, and dynamically updates the optimal transportation workload and the user interface displaying the optimal transportation workload when a store is realigned to be served by a different distribution center.

2. The system of claim 1, wherein the first database stores data relating to cost for private fleet, cost for third-party fleet, length of haul, driver program utilization, end of work week productivity loss, driver-tractor factors, schedule outline, staffing period, and driver utility.

3. The system of claim 1, wherein the second database stores data relating to driver working hours, slip seating requirements, exceptional truck assignments, tractor utilization, tractor idle cost, truck type, exceptional driver-truck requirement, and driver assignment to truck.

4. The system of claim 1, wherein the staffing module determines the optimal transportation workload using mixed integer programming.

5. The system of claim 1, wherein the staffing module determines the optimal transportation workload using stochastic modeling.

6. The system of claim 1, wherein the staffing module generates the optimal transportation workload for delivering inventory from the distribution center to the plurality of stores for a year.

7. The system of claim 1, wherein the staffing module generates the optimal transportation workload for 16 weeks, 17 weeks, or 18 weeks.

8. The system of claim 1, wherein the staffing module is configured to receive a user input specifying a difference in sales forecast and dynamically update the optimal transportation workload and the user interface displaying the optimal transportation workload based on the user input.

9. The system of claim 1, wherein the staffing module is configured to generate an optimal number of transportation resources from a private fleet and an optimal number of transportation resources from a third-party fleet.

10. The system of claim 1, wherein the plurality of distribution centers cannot generate, control, or modify the driver schedules generated by the staffing module.

* * * * *